United States Patent [15] 3,647,977

Closs [45] Mar. 7, 1972

[54] MULTIPLEXER

[72] Inventor: Felix H. Closs, Adliswil Zurich, Switzerland

[73] Assignee: International Business Machines Corporation, Armonk, N.Y.

[22] Filed: May 7, 1970

[21] Appl. No.: 35,413

[30] Foreign Application Priority Data

May 14, 1969 Switzerland ........................... 7445/69

[52] U.S. Cl. ............... 179/15 BA, 178/DIG. 3, 178/DIG. 23, 179/15 A

[51] Int. Cl. ........................................................ H04j 3/00

[58] Field of Search ............................. 178/DIG. 3, DIG. 23; 179/15 BA, 15.55, 15 AS, 15 BW, 15 BU; 307/231, 239, 242, 243; 340/412, 413, 415, 166

[56] References Cited

UNITED STATES PATENTS

| | | | |
|---|---|---|---|
| 3,485,953 | 12/1969 | Norberg | 179/15 BA |
| 3,199,081 | 8/1965 | Kok et al. | 179/15 BA |
| 2,935,627 | 5/1960 | Schngiogr | 179/15 BA |
| 3,508,007 | 4/1970 | Goodall et al | 179/15 AS |
| 3,312,783 | 4/1967 | Martin et al | 179/15 BA |
| 3,516,089 | 6/1970 | Cooper | 340/413 |
| 2,719,188 | 9/1955 | Pierce | 179/15 BU |

*Primary Examiner*—Kathleen H. Claffy
*Assistant Examiner*—David L. Stewart
*Attorney*—Hanifin and Jancin and John A. Jordan

[57] ABSTRACT

A multiplexer for use in a transmission system is provided with a priority switch with *n* inputs and *n* outputs. When a signal is present on only one of the inputs, the switch acts to connect the signal to its associated output. When a signal is present on more than one input at a given time, the priority switch acts to select for connection only one of the signals to its associated output, the selection process being achieved in a pseudorandom manner.

12 Claims, 7 Drawing Figures

Patented March 7, 1972

3,647,977

5 Sheets-Sheet 1

INVENTOR
FELIX H. CLOSS

BY John A. Jordan
ATTORNEY

MULTIPLEXER

BACKGROUND OF THE INVENTION

The invention relates to a multiplexer for use in a transmission system in which information signals occurring on a plurality of lines are supplied to inputs of a multiplexer and transmitted over one or more common transmission channels connected to the multiplexer output.

The rate of information to be transmitted over speech, video and data networks is rapidly growing and the development of improved transmission methods and systems of higher capacity is an essential requirement. Methods are already known and used by which information signals generated by a plurality of subscriber stations are supplied via individual input lines to a multiplexer which feeds the signals to a common broadband transmission channel. Due to the limited bandwidth of the transmission channel in these systems only a relatively small number of lines can be connected to the common channel, particularly when the signal sequences supplied to the multiplexer contain high frequencies, as it is the case in video transmission applications. In conventional PCM systems it is, for example, required that the bandwidth of the transmission channel be n times as high as that of the input lines, where the number of input lines equals $n$.

A more efficient utilization of the available channel capacity, e.g., for video transmission, can be achieved by using a method not requiring transmission of a signal representative of the gray-level for each single picture element. Taking into consideration the properties of the human eye viewing the receiver display it was found sufficient to transmit picture element signals only for a restricted number of elements selected according to certain criteria. An example is the so-called runlength method requiring transmission of a signal only when the analog signal corresponding to the gray-level of the scanned picture crosses predetermined threshold levels. The signals generated when crossing a threshold are conveyed to a multiplexer and transmitted via a common channel, for example, in the form of a binary address identifying the scanning station. In a very simple system employing this method, out of a plurality of threshold signals simultaneously generated by the scanning stations connected to the multiplexer only one of these signals is selected for transmission whereas the others are rejected. This naturally causes errors in the pictures displayed at the receivers. An improvement of the transmission quality can be obtained by storing for a short time those signals which cannot be transmitted immediately and by transmitting these signals insignificantly delayed as soon as a channel is free.

A multiplex-method based on this principle has been described in U.S. application Ser. No. 835,437. Its application, however, is restricted to transmission of black and white pictures. It is not suited for very high-speed transmission required for gray-level picture systems.

It is, therefore, an object of this invention to provide an improved multiplexer arrangement.

It is a further object of this invention to provide a multiplexer applicable in systems requiring transmission of very high frequency signals as, for example, for gray-level picture transmission, and requiring only relatively simple hardware. The multiplexer should, furthermore, be applicable in systems in which during a sampling interval not only a single information bit or a coded address is to be transmitted but also, in systems requiring, during each interval transmission of a group of information bits defining, for example, the amount of change in amplitude of the analog signal of a given scanner station since the last transmission.

It is yet a further object of this invention to provide a multiplexer in which the priority decision, required in case a plurality of input signals occur simultaneously, is performed in logic decision stages simultaneously for all inputs thereby preventing a transmission delay.

According to the invention these and other objects and advantages are achieved by a multiplexer arrangement which is characterized by a priority switch with $n$ inputs and $n$ outputs, said switch connecting a signal carrying input to its associated output when, at a given point in time, a signal is supplied only to that input and when, in case signals are supplied to a plurality of inputs simultaneously, one of said plurality of inputs is selected by the priority switch. The multiplexer arrangement according to the invention is further characterized by the fact that the $n$ outputs of the priority switch are connected to an encoder which generates an address identifying said connected input and which supplies the address to a common transmission channel.

The foregoing and other objects, features and advantages of the invention will be apparent from the following more particular description of preferred embodiments of the invention, as illustrated in the accompanying drawings.

DETAILED DESCRIPTION OF THE DRAWINGS

Figure 1:
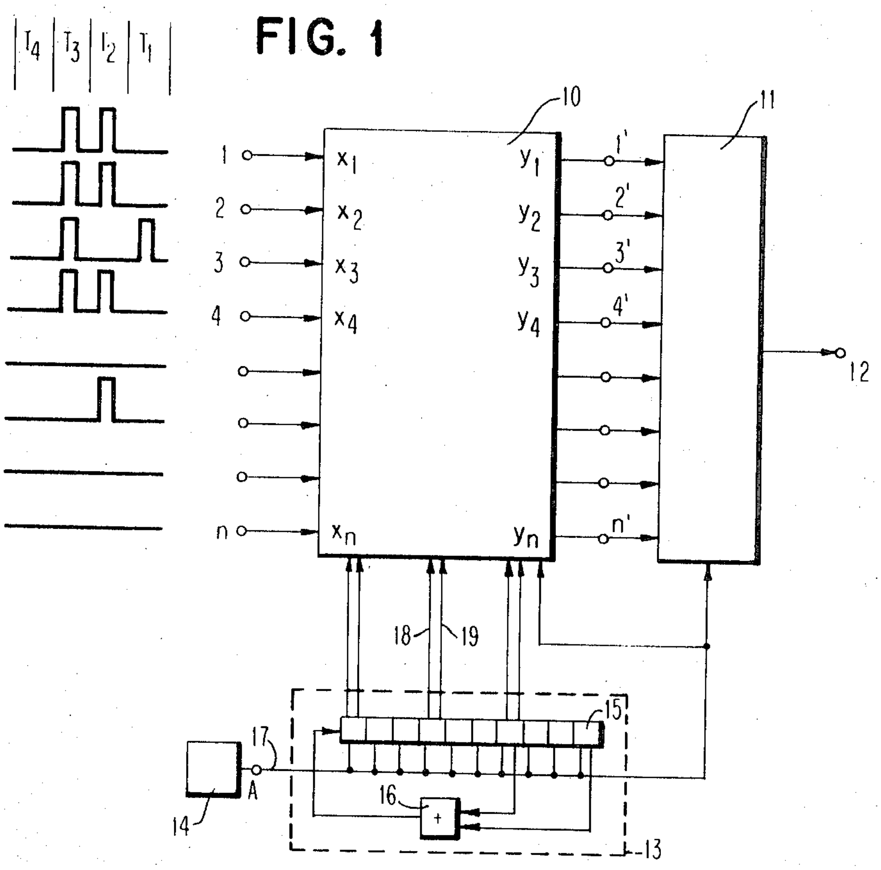
FIG. 1 depicts a block diagram of an embodiment of the multiplexer arrangement in accordance with the principles of the present invention, said arrangement showing eight inputs.

FIG. 1 shows an embodiment of the inventive multiplexer. The following description, in which for better understanding several assumptions regarding operating conditions of the multiplexer as well as occurring signals are made, is based on an application of the multiplexer in a gray-level video system in which a plurality of picture scanners are connected to the inputs of the multiplexer.

The multiplexer comprises a priority switch 10 with inputs 1, 2, 3 ... $n$ ($n=8$) and outputs 1', 2', 3' ... $n'$. The outputs are connected to the $n$ inputs of an encoder 11, which in the described embodiment is employed for address generation as well as for the actual multiplexing function. Its output 12 is connected to the common transmission channel. A pseudorandom pulse sequence generator is designated 13. Its output control pulses are supplied to priority switch 10 via pairs of lines 18, 19. The generator, only schematically shown in FIG. 1, consists of a multistage shift register 15 to which a pulse sequence A generated by clock 14 and acting as shift pulses is supplied via line 17. The output potentials of two selected stages of the register are applied to adder circuit 16, the output signals of which are fed to the shift register input. Because such pseudorandom generators are well known, the one used is not described in more detail. With a proper arrangement it can be seen that after storing an initial value different from zero, the value contained in the register is altered with each clock pulse A in such a way that, e.g., in a 10-stage register capable of storing 1023 values different from zero, after each of 1023 subsequent clock pulses a different value is stored. Each value occurs during this time interval only once. True and complement output potentials of selected register stages (in the example stages 1, 4 and 7) are supplied to priority switch 10 via pairs of lines 18, 19. The described mode of operation of generator 13 results in a pseudorandom sequence of these control potentials.

Clock 14 also controls the scanner stations, not shown in FIG. 1, which are connected to the eight multiplexer inputs as well as priority switch 10 and encoder 11. This guarantees synchronous operation of the complete system.

Next to each of inputs 1 through $n$ there is schematically shown a pulse sequence, assumed to be generated by the scanning stations, which is received at the associated inputs. Thus, at sampling interval T1 a pulse is received at input 3 and at sampling interval T2 pulses are received at inputs 1, 2, 4 and 6, respectively.

The function of priority switch 10 can generally be defined in terms of three possible input conditions:

1. If during a given sampling interval T no pulse occurs at any one of inputs 1 through $n$ (e.g., interval T4), none of the outputs 1' through $n'$ provides s signal;
2. If during an interval T a pulse occurs at only one of the inputs 1 through $n$, priority switch 10 provides a signal at the corresponding output (e.g., during interval T1 at output 3');
3. If during a scanning interval T pulses are supplied to more than one of the inputs 1 through $n$, priority switch 10 assigns, controlled by the pseudorandom pulses sequence, priority to one of the inputs, so that this one input is connected to its associated output and the other input pulses are rejected (e.g., during time interval T2 only one of the signal carrying inputs 1, 2, 4 and 6 is connected).

In the multiplexer arrangement shown in FIG. 1 the function of encoder 11 is restricted to the generation of a binary coded address corresponding to the signal carrying input connected through switch 10. For the described system with eight inputs a three-bit-address is required. These bits are fed one after the other to the common channel connected to output 12. Such encoder circuits are well known in the art and, therefore, a detailed description of encoder 11 will not be given here.

Figure 2B:
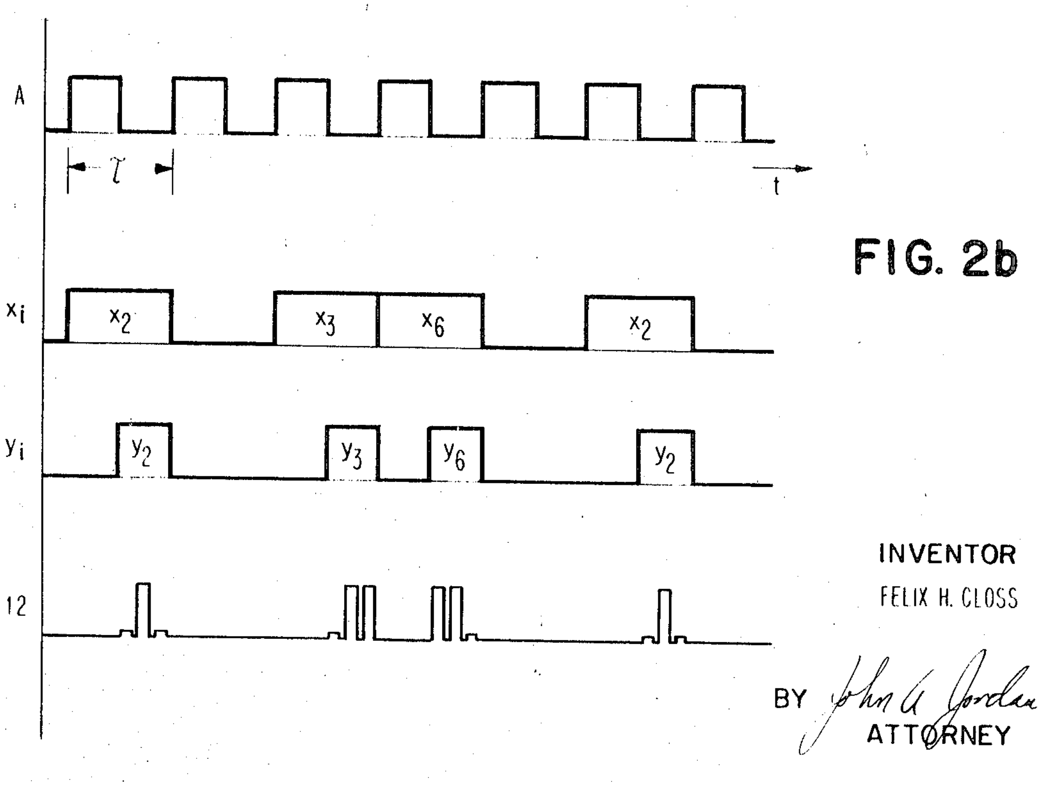
FIG. 2*b* is a diagram illustrating, for the multiplexer shown in FIG. 1, the time relation between clock, input and output pulses.
Figure 2A:
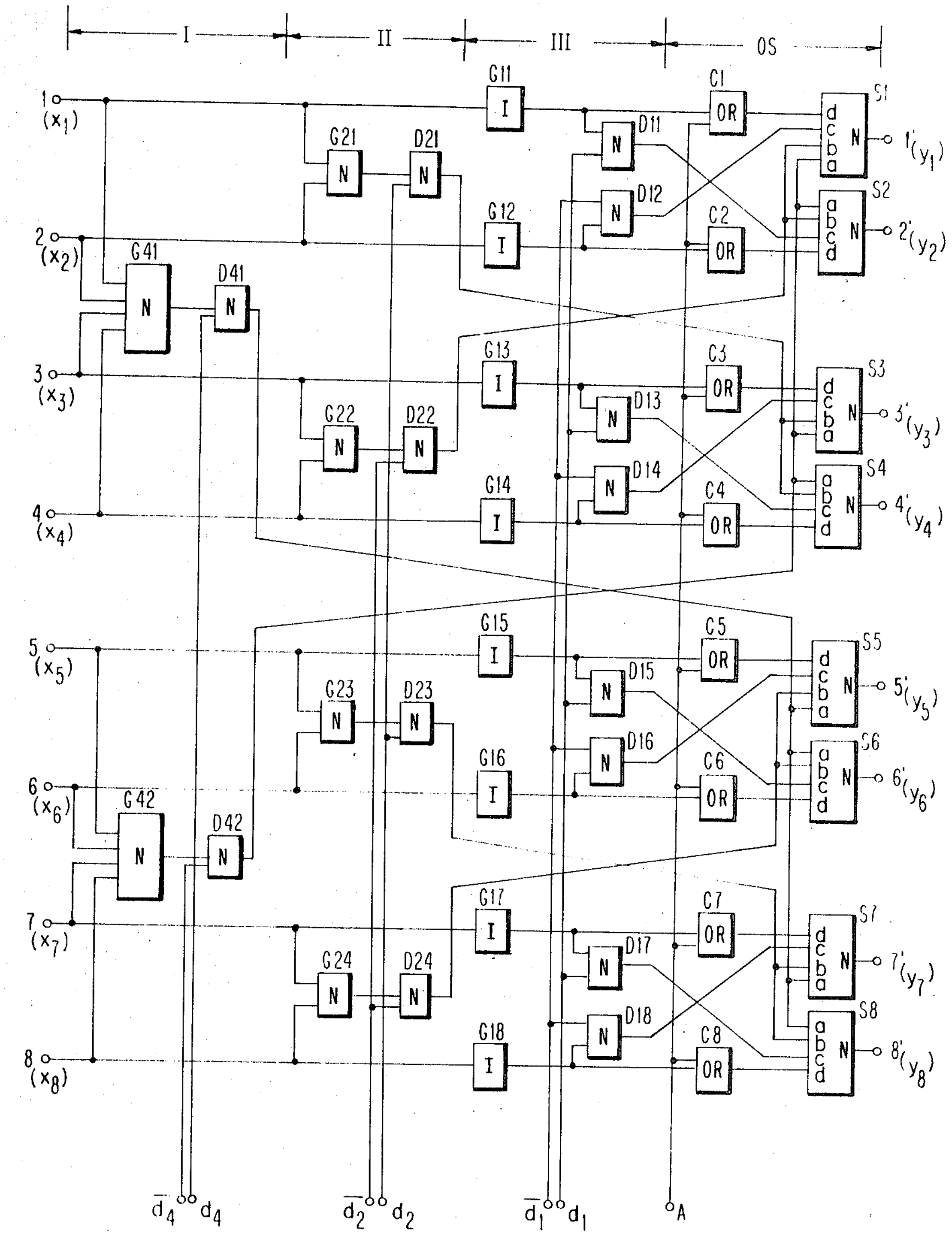
FIG. 2*a* shows the logic circuitry of the priority switch used in the multiplexer shown in FIG. 1.

FIG. 2*a* shows the logic circuitry of the priority switch designated 10 in FIG. 1. It again comprises inputs 1 through 8 to which input signals $x_1$ through $x_8$ are supplied, as well as outputs 1' through 8' from which output signals $y_1$ through $y_8$ can be taken. Control signals generated by pseudorandom generator 13, shown in FIG. 1, are supplied to terminals designated $d_1$, $d_2$ and $d_4$ (true) and $\overline{d_1}$, $\overline{d_2}$, and $\overline{d_4}$ (complementary). Terminal A is connected to clock 14, also shown in FIG. 1.

The following general rules apply to the logic circuits described below: Positive pulses or potentials are representative of a binary "1" and zero potentials correspond to a binary "0." All pulses or signals mentioned in the description are positive even if this is not specifically indicated. Lines carrying positive potential are called "signal carrying" and lines carrying zero potential "not signal carrying."

With the exception of OR-circuits C1 through C8 and inverters G11 through G18, the logic circuitry of the priority switch comprises exclusively NOR-circuits. Each of these circuits, marked with an N, produces an output signal only when neither of its input lines carries a signal.

The priority switch shown in FIG. 2a essentially consists of three decision stages designated I, II and III, as well as clock controlled output stage OS comprising OR-circuits C1 through C8 and NOR-circuits S1 through S8. In the first decision stage with $n$ inputs (in the described embodiment $n = 8$) groups of $n/2$ (=4) inputs each are combined by NOR-circuits G4$x$ (G41, G42). In case of simultaneously occurring input signals at at least one of the inputs of each of the groups, priority is assigned to one of the groups via NOR-circuits D4$x$ (D41, D42) which are controlled by pseudorandom signals $d_4$, $\overline{d_4}$. The other group is locked in that NOR-circuit D4$x$, associated with the first group to which priority is assigned, conveys a blocking signal to inputs a of all NOR-circuits S$x$ of the group to be blocked. Simultaneously, NOR-circuits G2$x$ (G21, G22, G23, G24) of decision stage II combine $n/4$ (=2) adjacent inputs. When input signals occur simultaneously at at least one of the inputs of two adjacent groups (input 1 or 2 and input 3 or 4, respectively), priority is assigned to one of these groups controlled by pseudorandom signals $d_2$, $\overline{d_2}$. The other group is blocked in that the NOR-circuit D2$x$ associated with the first group supplies a blocking signal to inputs $b$ of NOR-circuits S$x$ of the group to be blocked. Also simultaneously, priority is assigned in decision stage III to one of the $n/4$ (=2) inputs of the group selected for connection in decision stage II. Stage III is controlled by pseudorandom signals $d_1$ and $\overline{d_1}$. In this way, each NOR-circuit Sx receives a blocking signal except for that NOR-circuit associated with the input selected for connection during a given scanning interval.

FIG. 2*b* illustrates the pulse time diagram of the priority switch shown in FIG. 2*a*. The clock pulse sequence is designated A. The clock produces during each clock period $\tau$ a positive pulse of length $\tau/2$ and afterwards zero potential. Pulse sequence designated $x_i$ in FIG. 2*b* is an assumed input signal sequence. For simplicity reasons, it is here assumed that during each time interval, defined by period $\tau$ of the clock, an input signal is received only by one input. The assumed signal sequence $x_i$ shows receipt of signals sequentially by inputs 2 ($x_2$), 3($x_3$), 6 ($x_6$) and again 2 ($x_2$) in FIG. 2*a*. During each clock period, all NOR-circuits S1 through S8 in FIG. 2*a* are at first blocked by the positive A pulses reaching the NOR-circuits via OR-circuits C1 through C8. Within this time interval $\tau/2$, the logic operations are performed in decision stages 1 through III. Connection of the selected input through its associated NOR-circuit S$x$ to the output takes place only after clock pulse A has returned to zero. The output pulses, therefore, have a duration of $\tau/2$ only. This is illustrated in FIG. 2*b* by output pulse sequence designated $y_i$. The pulse sequences designated "12" indicate the binary addresses generated by encoder 11 and transmitted via the common channel. The binary signal 010 corresponds, for example, to the address of selected input 2. As it may be seen from the time diagram shown in FIG. 2*b*, an embodiment has been chosen in which the transmission channel provides a bandwidth allowing for transmission of a three-bit-address during each scanning interval defined by clock period $\tau$.

The logic operations performed in the priority switch can be expressed for each output signal $y_x$ as a function of input signals $x_1$ through $x_8$ by the following equations:

$$y_1 = x_1 \; [\overline{(x_5 v x_6 v x_7 v x_8)} \; v\bar{d}_4] \; [\overline{(x_3 v x_4)} \; v\bar{d}_2] \; [\bar{x}_2 v\bar{d}_1]$$

$$y_2 = x_2 \; [\overline{(x_5 v x_6 v x_7 v x_8)} \; v\bar{d}_4] \; [\overline{(x_3 v x_4)} \; v\bar{d}_2] \; [\bar{x}_1 v d_1]$$

$$y_3 = x_3 \; [\overline{(x_5 v x_6 v x_7 v x_8)} \; v\bar{d}_4] \; [\overline{(x_1 v x_2)} \; v d_2] \; [\bar{x}_4 v\bar{d}_1]$$

$$y_4 = x_4 \; [\overline{(x_5 v x_6 v x_7 v x_8)} \; v\bar{d}_4] \; [\overline{(x_1 v x_2)} \; v d_2] \; [\bar{x}_3 v d_1]$$

$$y_5 = x_5 \; [\overline{(x_1 v x_2 v x_3 v x_4)} \; v d_4] \; [\overline{(x_7 v x_8)} \; v\bar{d}_2] \; [\bar{x}_6 v\bar{d}_1]$$

$$y_6 = x_6 \; [\overline{(x_1 v x_2 v x_3 v x_4)} \; v d_4] \; [\overline{(x_7 v x_8)} \; v\bar{d}_2] \; [\bar{x}_5 v d_1]$$

$$y_7 = x_7 \; [\overline{(x_1 v x_2 v x_3 v x_4)} \; v d_4] \; [\overline{(x_5 v x_6)} \; v d_2] \; [\bar{x}_8 v\bar{d}_1]$$

$$y_8 = x_8 \; [\overline{(x_1 v x_2 v x_3 v x_4)} \; v d_4] \; [\overline{(x_5 v x_6)} \; v d_2] \; [\bar{x}_7 v d_1]$$

The operation of the priority switch thus far explained with the aid of FIG. 2*a*, will now be explained in more detail with reference to FIG. 2*c*. As an example, a case is chosen corresponding to the input signal situation indicated for scanning interval T2 shown in FIG. 1. It can be seen that during this interval inputs 1, 2, 4 and 6 simultaneously receive an input signal.

Figure 2C:
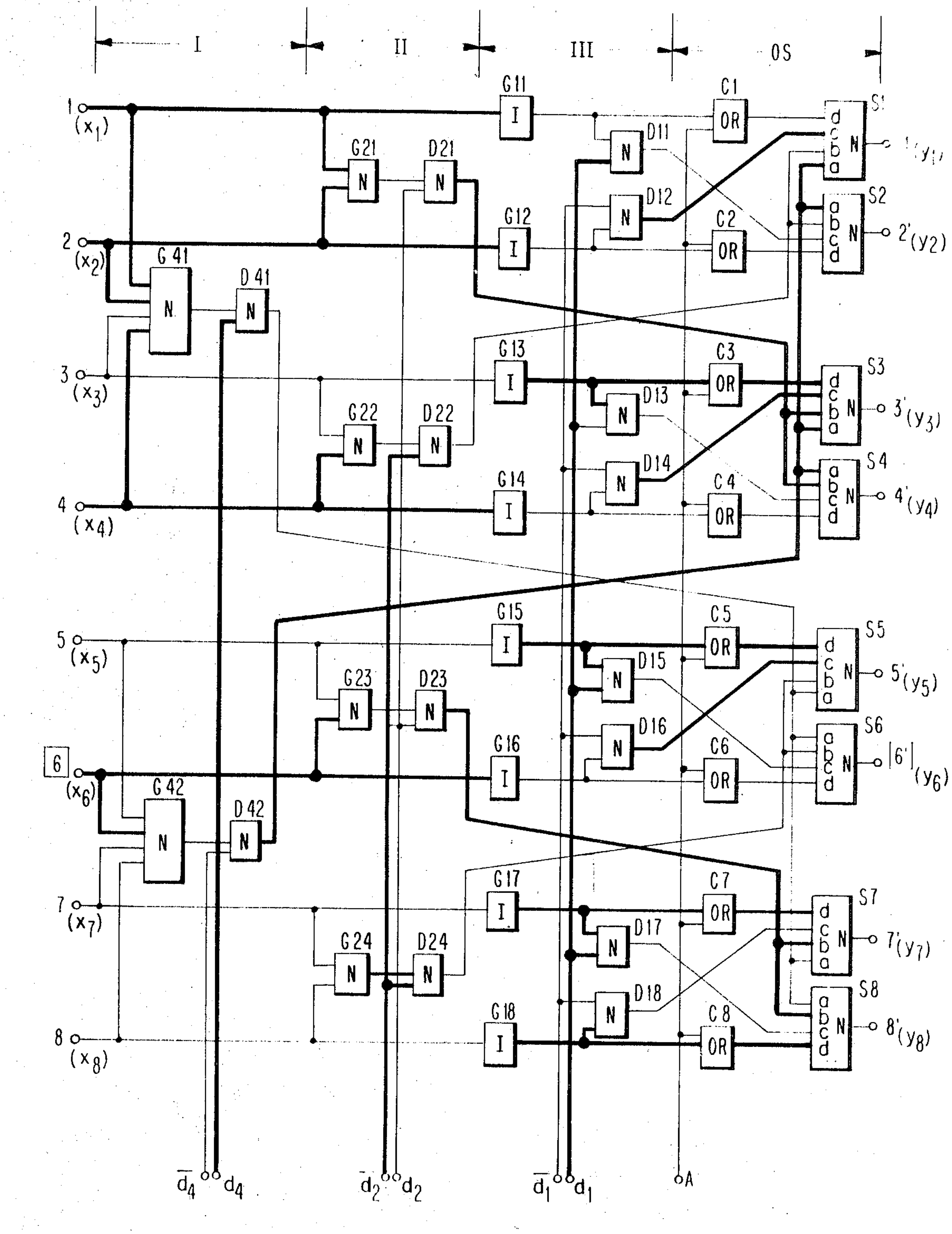
FIG. 2*c* shows the circuit shown in FIG. 2*a*, in which the priority assignment method is illustrated for a time interval during which a plurality of input signals occur simultaneously.

The circuitry shown in FIG. 2*c* is identical to that of FIG. 2*a*. However, the connections or lines which carry a positive signal, in accordance with the chosen example, are distinguished by heavy lines. It is assumed that the pseudorandom pulses present during the considered time interval T2 are as follows: Input terminals $d_1$; $\overline{d_2}$ and $d_4$ are positive and input terminals $\overline{d_1}$, $d_2$ and $\overline{d_4}$ are, therefore, accordingly negative.

In decision stage I, neither of NOR-circuits G41 and G42 produces an output signal because at least one of its inputs is positive (1, 2 and 4 on the one hand and 6 on the other). NOR-circuit D41 is blocked by the positive $d_4$ signal applied to one of its inputs. NOR-circuit D42, however, generates an output signal because its inputs, connected to G42 and $\overline{d_4}$, respectively, carry zero potential. This output signal is supplied to inputs a of NOR-circuits S1 through S4 thereby blocking these circuits. Thus, outputs 1′ through 4′ of NOR-circuits S1 through S4, respectively, remain at zero potential and signals occurring at the associated inputs 1 through 4 of the priority switch are blocked from reaching the common channel.

The logic operations performed in decision stages II and III for priority switch inputs 1 through 4 need not be considered in the following because these inputs are already blocked and the result of the logic operations can be neglected. These operations, furthermore, correspond exactly to those to be described in the following for switch inputs 5 through 8.

In stage II, NOR-circuit G23 is blocked by the signal supplied to input 6, so that its output, therefore, remains at zero potential. Neither input of NOR-circuit G24, however, is carrying a signal and the positive output signal resulting therefrom is fed to one of the inputs of NOR-circuit D24. The second input of this latter circuit, connected to $\overline{d_2}$, receives a positive signal as well. The output of NOR-circuit D24, therefore, remains at zero potential thereby leaving NOR-circuits S5 and S6 unblocked. Since NOR-circuit D23 receives no positive input, however, it accordingly conveys a blocking signal to inputs b of both NOR-circuits S7 and S8. The latter accordingly prevent connection of inputs 7 and 8 to their associated outputs independent of the decisions of stage III.

In stage III, inputs 5 and 6 are connected to inverters G15 and G16. Due to the presence of an input signal on input 6, the output potential of inverter G16 remains zero. This latter condition, as well as the condition of control signal $\overline{d_1}$, appear at the inputs of NOR-circuit D16 and the latter in turn supplies a blocking signal to input *c* of NOR-circuit S5, thereby preventing through-connection of input 5 to its output. Since both inputs of NOR-circuit D15 carry positive potential, the output therefrom connected to input *c* of NOR-circuit S6 remains at zero potential. At this point in time, only NOR-circuit S6 of all output NOR-circuits S1 through S8 is not blocked by a blocking signal produced by decision stages I through III.

The operations described above take place during the first section $\tau/2$ of a clock period. During this time, all NOR-circuits S1 through S8 are blocked by the positive clock signal supplied to terminal A and delivered to input *d* of these NOR-circuits via OR-circuits C1 through C8, respectively. Only after the clock pulse returns to zero are NOR-circuits S1 through S8 released so that NOR-circuit S6, the only NOR-circuit not receiving a blocking signal at at least one of its inputs a through *c*, produces a positive output signal $y_6$ appearing at output 6′. The encoder not shown in FIG. 2*c* generates the binary address 110 which is supplied to the transmission channel.

Figure 3:
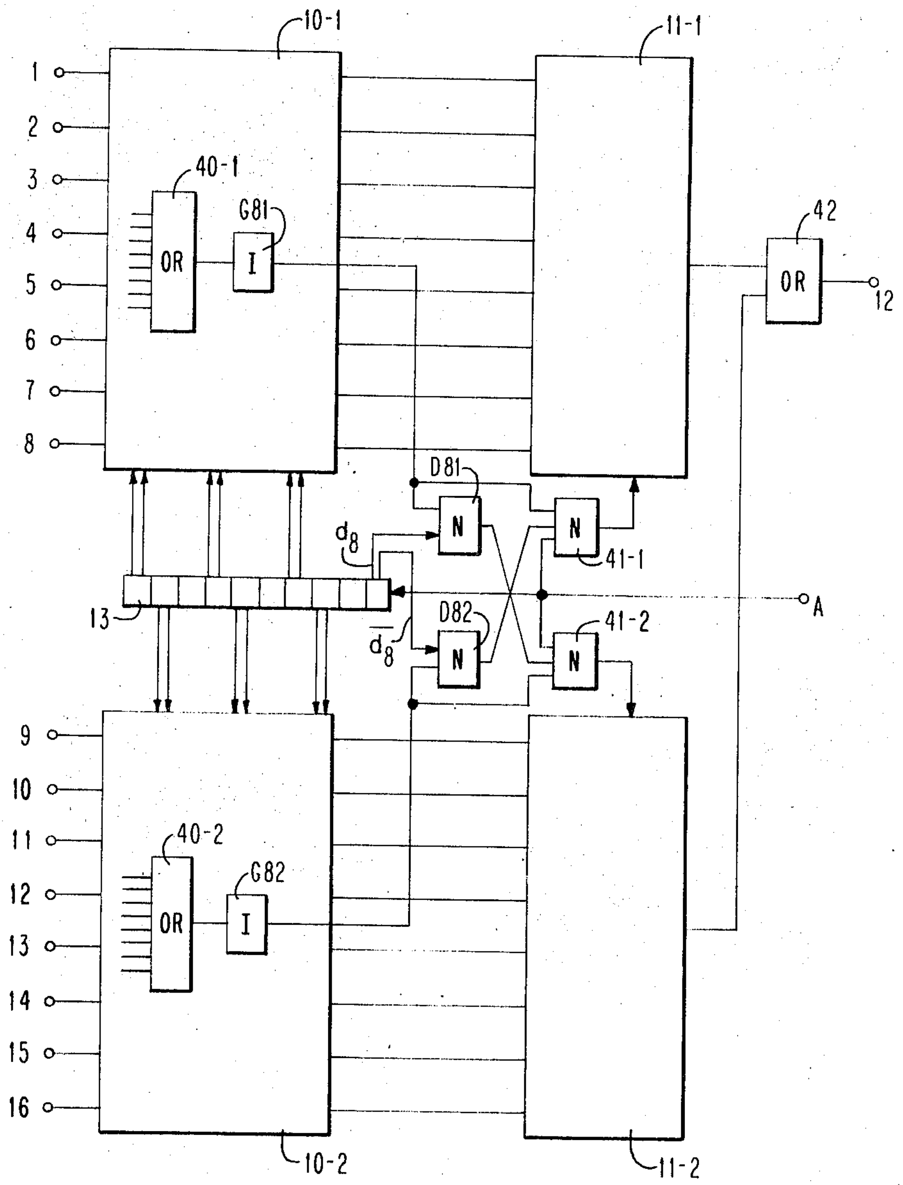
FIG. 3 depicts a block diagram of a further embodiment of the multiplexer arrangement in accordance with the principles of the present invention, said arrangement showing 16 inputs.

FIG. 3 shows the block diagram of a further embodiment of the multiplexer arrangement in accordance with the principles of the present invention. It comprises a total of 16 inputs 1 through 16 which, in accordance with the above-described priority scheme, can be connected to a common transmission channel. The illustrated multiplexer consists mainly of two circuit arrangements 10–1 and 11–1, as well as 10–2 and 11–2 arranged in parallel, each of which corresponds to the multiplexer described with reference to FIG. 1. Control of both priority switches 10–1 and 10–2 is achieved by common pseudorandom generator 13 which is basically also identical to that shown in FIG. 1. In addition to the control signals required for the priority switches, this generator provides control signals $d_8$ and $\overline{d_8}$ which are supplied to one input of each of NOR-circuits D81 and D82, as shown in the diagram. Encoders 11–1 and 11–2 receive clock pulse sequences A, via NOR-circuits 41–1 and 41–2. Encoders 11–1 and 11–2 produce binary coded address signals only if they simultaneously receive an input signal, connected through the associated priority switch, at one of their eight inputs and a positive pulse from the corresponding NOR-circuit 41–1 and 41–2, respectively.

In the following, the arrangement shown in FIG. 3 is described with the aid of an example. It is assumed that during a given scanning interval input signals are received at inputs 1 and 9. These signals are respectively connected through the associated priority switches 10–1 and 10–2 to the corresponding encoders 11–1 and 11–2. However, only one of the encoders should generate the corresponding binary address, which now requires four-bit-positions. This address is supplied, via OR-circuit 42, to the transmission channel connected to output 12. In the assumed case each of OR-circuits 40–1 and 40–2 is respectively connected to its associated eight inputs to thereby convey the positive signals thereat to its associated inverters G81 and G82, respectively. Accordingly, the inverter G81 and G82 outputs remain at zero potential. Assume that during this scanning interval $d_8$ is at zero potential and, therefore, $\overline{d_8}$ is positive. As such, NOR-circuit D82 is blocked by $\overline{d_8}$ and, therefore, does not convey a positive blocking signal to NOR-circuit 41–1. NOR-circuit D81, on the other hand, does supply a blocking signal to NOR-circuit 41–2. Also present and acting as a blocking pulse to each of NOR-circuits 41–1 and 41–2 at this time, is the positive pulse of the corresponding clock cycle. Accordingly, neither encoder 11–1 nor 11–2 is conditioned to generate an address. However, as soon as the positive clock pulse A blocking NOR-circuits 41–1 and 41–2 has ceased, after $\tau/2$, NOR-circuit 41–1 produces an output pulse since its three inputs, connected respectively to the clock, NOR-circuit D82 and inverter G81, are now at zero potential. Encoder 11–1 receives, at the same time, the signal connected through priority switch 10–1 and generates the binary address 0001. This is supplied to the transmission channel.

In case only one input, for example, input 1, receives a signal during a given scanning interval, encoder 11–1 is provided with a signal from NOR-circuit 41–1 because NOR-circuit D82 is, independent of $\overline{d_8}$, blocked by the positive output signal of G82. It, therefore, cannot block NOR-circuit 41–1.

The embodiments described so far can be utilized in transmission systems requiring, for each input signal supplied to the multiplexer, only the transmission of the binary address but not any additional information signals. Such embodiments are, for example, suited for transmission of black and white pictures, in a system as described, for example, in U.S. application Ser. No. 835,437. For gray-level picture transmission it is necessary, as already mentioned, to provide additional circuitry between the scanner stations and the multiplexer in which the analog signals corresponding to the various gray-levels are converted into single pulses or groups of pulses. These circuitries for gray-level conversion are not the subject of the present invention and will, therefore, not be described in detail. However, various methods and systems are possible and these methods and systems differ in the scheme of the resulting pulses or signals applied to the multiplexer. If, for instance, the run-length method is used, pulses are supplied to the multiplexer only when the analog signals cross predetermined threshold values corresponding to different gray-levels. Depending on whether the threshold is crossed by an ascending or descending analog signal, positive or negative pulses occur and it is not sufficient to transmit only the address of the scanning station. In addition, transmission of a sign bit is required. Other methods have been proposed requiring, for example, at certain points in time transmission of a value defining the change in amplitude of the analog signal since the last transmission. This binary coded value forms, together with the required sign bit, a multibit word which is to be transmitted together with the address bits. In systems employing such a method it is, therefore, required that the connection path provided by the priority switch be maintained for the complete word and not only for one bit.

Figure 4A:
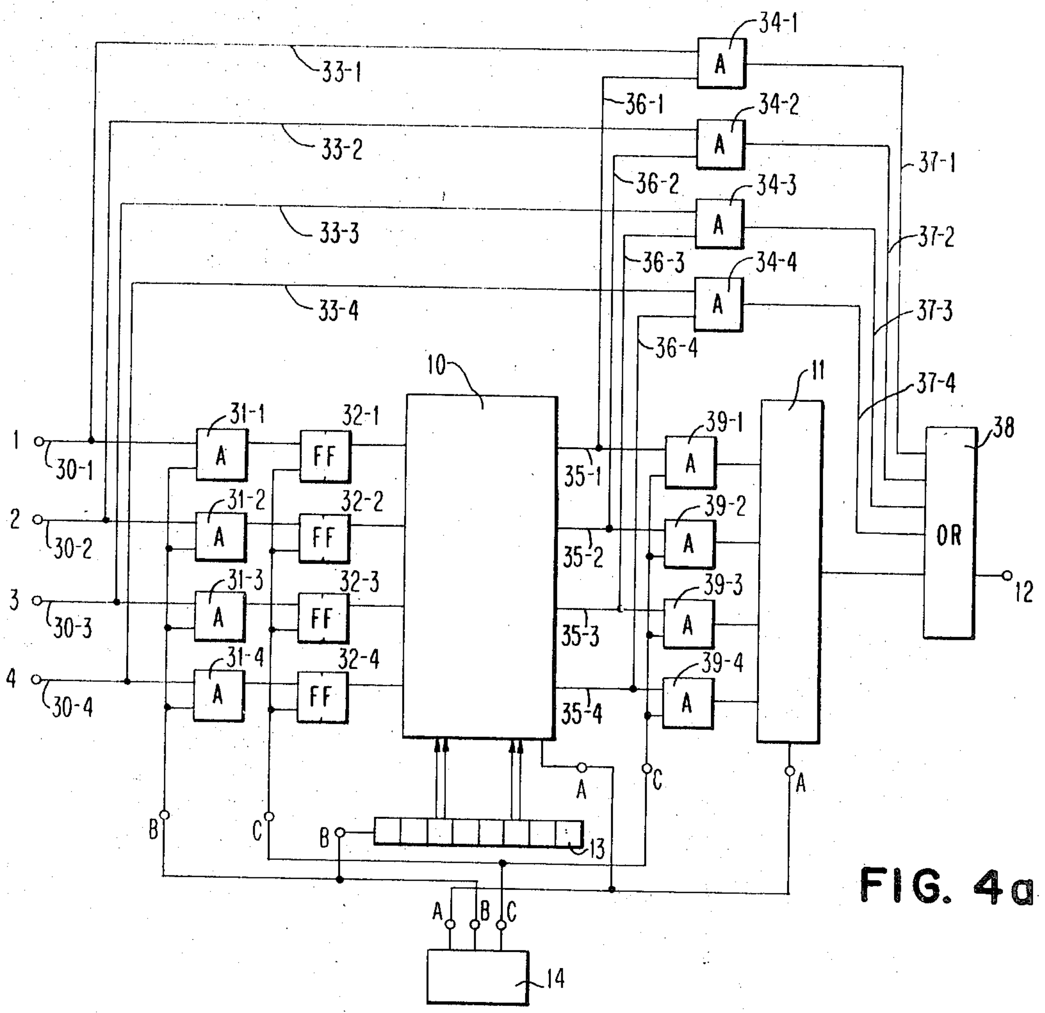
FIG. 4*a* depicts a block diagram of yet another embodiment of the multiplexer arrangement in accordance with the principles of the present invention, said arrangement allowing for transmission of a plurality of bits during each scanning interval.
Figure 4B:
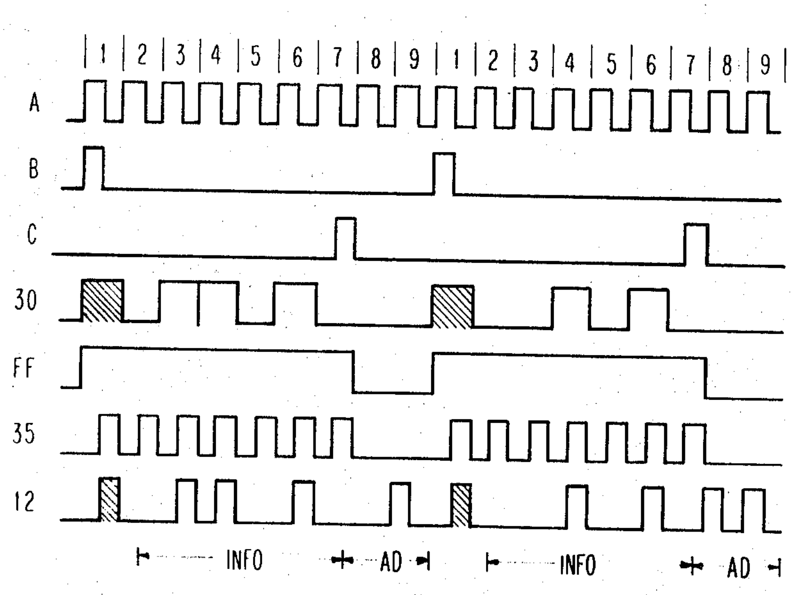
FIG. 4*b* is a diagram illustrating, for the multiplexer shown in FIG. 4*a*, the time relation between clock, input and output pulses.

FIG. 4*a* schematically shows an embodiment of the inventive multiplexer suited for utilization in a system described in the foregoing. The corresponding pulse time diagrams are illustrated in FIG. 4*b*. The clock provides, in addition to the basic pulse sequence A, those sequences shown in lines designated "B" and "C." Clock outputs carrying these pulse sequences are connected to those terminals designated A, B and C in FIG. 4*a*. A system is assumed in which the words or messages to be transmitted consist of five bits indicating the change in amplitude and the sign. Prior to each message a switch bit, which is always positive (hatched pulse in line "30" of FIG. 4*b*), is provided. A system with four scanning stations has been chosen requiring a two-bit-address. An example of a complete signal sequence occurring at output 12 of the multiplexer is shown in line 12. There the hatched switch bit is followed by five information bits (INFO) and two address bits (AD).

The basic circuits of the arrangement shown in FIG. 4*a* are essentially the same as those explained in connection with FIG. 1 and identified by the same reference characters. Interconnected between each of the respective input terminals 1 through 4, shown in FIG. 4*a* and priority switch 10 are AND-circuits 31 followed by flip-flop circuits 32. These latter flip-flop circuits are switched ON by a positive pulse, applied to the upper input line, and are switched OFF by a positive pulse applied to the lower input line. In the ON-condition, the output of a flip-flop provides positive potential and in the OFF-condition, provides zero potential. In each of the input lines of encoder 11 and AND-circuit 39 is provided, one input of which is connected to one of the outputs 35 of the priority switch 10 and the other of which is connected to output C of clock 14. Parallel to the serial priority switch-encoder path arrangement between input terminals 1 through 4 and the output 12 an additional path is provided for each input line. Each of these paths comprises a line 33 coupling an input line 30 to one input of AND-circuit 34 and a line 37 coupling the output of the latter to an input of OR-circuit 38 arranged between encoder 11 and the transmission channel coupled to output terminal 12. The other input of AND-circuit 34 is connected, via a line 36, to the appropriate output line 35 of priority switch 10.

The mode of operation of the arrangement shown in FIG. 4*a* is described below with the aid of a simple example. It is assumed that during a given scanning interval, a signal sequence is applied only to input 1. The signal appearing during the first time interval 1, shown in FIG. 4*b*, is the switch bit provided to set up the connection between input 1 and the transmission channel. The switch bit is applied to AND-gate 31–1 via line 30–1 and reaches flip-flop 32–1 because the AND-gate is at the same time conditioned by clock pulse B. Flip-flop 32–1 is switched ON and remains ON to be turned OFF only by the trailing edge of clock pulse C occurring in time interval 7 (see line "FF" in FIG. 4*b*). In the assumed example no other input to priority switch 10 receives a signal during time interval 1 and input 1 is connected to output 35–1. Since pseudorandom generator 13 is shifted with the "slow" clock pulse sequence B, this through-connection path is maintained during the time period of time intervals 1 through 7 under control of clock pulses A. A pulse sequence is shown in line "35" of FIG. 4*b* as it occurs on output line 35–1 of priority switch 10. The connection path is interrupted at time 7 when flip-flop 32–1 is switched off by the C clock pulse. Thereafter, the priority switch remains blocked until the next switch bit is received on one of its input lines, for example, on input 3.

During the time period of time interval 1 through 7, positive potential is applied to only one input of AND-gate 39–1 (clock pulse C occurs only during time interval 7) and encoder 11, therefore, does not yet receive a starting pulse initiating generation of an address. On the other hand, positive potential is applied to both inputs of AND-gate 34–1 since positive information bits are applied directly via line 33–1 and, after clock pulse A has returned to zero potential, positive potential is applied via line 36–1. The output pulse of AND-gate 34–1 reaches the transmission channel via line 37–1 and OR-circuit 38. In this manner all positive information bits are connected and applied to the transmission channel. The information bits coupled to the transmission channel are shown in FIG. 4*b*, line "12" in time interval labeled "INFO."

As already mentioned, flip-flop 32–1 is switched OFF at time 7 by clock pulse C thus blocking the priority switch. However, prior to interrupting the connection, the C pulse conditions AND-gate 39–1 thus allowing the last pulse occurring on line 35–1 to reach encoder 11. The encoder generates the binary address 01 corresponding to input 1. During time interval "AD" shown in FIG. 4*b*, line "12," these address bits are applied to the transmission channel, via OR-circuit 38, thereby completing the word to be transmitted. Now the whole arrangement is again in its initial state and can, in response to clock pulse B, resume transmission of the next information signal sequence from any one of the inputs such as, for example, from input 3, as indicated in line 12 of FIG. 4*b*.

In the event switch bits occur at time 1 simultaneously on more than one input, the signal sequence of only one input is transmitted in the same manner as that explained with reference to the arrangement shown in FIG. 1. Controlled by the priority switch the connection paths for the other inputs remain blocked.

In the system described with the aid of FIGS. 4*a* and 4*b* the transmission speed on the common transmission channel coupled to output 12 is the same as that of the input lines. In practical applications, however, the transmission channel will usually permit a higher transmission rate than that made available by the input lines. Thus, in order to use this channel capacity more effectively, such systems may require temporary storage of the signal sequences received at a relatively low bit rate from the scanner stations. In addition, it is possible that the address bits also first be stored. After assembling the whole word to be transmitted in a buffer store, high-speed transmission is initiated.

In the embodiments described above, at a given point in time only the signals of one input are transmitted. Signals or signal sequences applied simultaneously to nonselected inputs are suppressed. This naturally causes some error at the receiver display. An improvement is possible by storing the otherwise suppressed signals until the channel is ready for transmission. In most practical cases such an arrangement would result in only small and uncritical delays and picture distortions at the receiver. In more sophisticated systems even these latter errors can be prevented by transmitting additional information bits indicating the delay. Thus, by allowing for more complex circuitry and a small reduction in transmission capacity a correction at the receiver stations becomes possible.

The inventive multiplexer has been explained in connection with video transmission system applications. It is, however, apparent that the multiplexer can also be employed in other information transmission systems such as, for example, in digital speech transmission systems. The logic circuitries described also represent only preferred examples.

I claim:

1. A multiplexer for use in a transmission system wherein information signals occurring on a plurality of multiplexer input lines are coupled for transmission over a lesser plurality of common transmission channels coupled to the multiplex output, said multiplexer comprising switch-circuit means having a plurality of inputs for receiving respective ones of said information signals and the like plurality of corresponding outputs with said switch circuit means including logic circuit means coupling the information signal present on any one of said plurality of inputs to the corresponding one of said plurality of outputs when an information signal is present on only said any one of said plurality of inputs and selectively connecting one of more than one information signal simultaneously present on respective ones of said plurality of inputs to the corresponding one of said plurality of outputs when more than one information signal is simultaneously present, said logic circuit means including random pulse generating means coupled thereto to generate random control pulses for assigning priority and controlling the selection of connection of one information signal to its corresponding output when more than one information signal is simultaneously present on respective ones of said plurality of inputs.

2. The multiplexer as set forth in claim 1 wherein priority is assigned under pseudorandom control.

3. The multiplexer as set forth in claim 1 wherein the said plurality of outputs of said switch circuit means are connected to encoder means for generating an address corresponding to the address of whichever of said outputs provides an information signal at that time.

4. The multiplexer as set forth in claim 3 wherein said switch circuit means having a plurality of inputs comprises;

an input stage including a pair of input logic gate means with one of said pair of input logic gate means responsive to one-half of said plurality of inputs and the other of said pair of input logic gate means responsive to the other half of said plurality of inputs so that each thereby respectively produces a logical output in response to said inputs; and an output stage including a plurality of output logic gate means corresponding in number to said plurality of inputs, each of said output logic gate means having a first input responsive to be controlled by a different one of said plurality of inputs and having a second input responsive to be controlled by the said logical output from one of said pair of input logic gate means.

5. The multiplexer as set forth in claim 4 wherein said input logic gate means and said output logic gate means are NOR-gate means and wherein the said second input of one-half of said plurality of output logic gate means is responsive to the said logical output of one of said pair of input logic gate means and the said second input of the other half of said plurality of output logic gate means is responsive to the said logical output of the other of said pair of input logic gate means.

6. A multiplexer system for coupling the information signal and address of individual ones of a plurality of information bearing inputs to transmission channel means comprising;

priority switching circuit means having n inputs and *n* corresponding outputs with logic circuit means coupling said *n* inputs to said *n* outputs so that when an information signal is present on only one of said *n* inputs, said signal is connected to its said corresponding output;

random pulse generator means coupled to said logic circuit means to randomly assign priority and control selection of connection of a single information signal when information signals are simultaneously present on more than one of said *n* inputs; and encoding means having output means and input means with said input means coupled to the said *n* outputs of said priority switching circuit means so as to generate the address on said output means of that priority switching circuit means input connected through to provide an information signal to the said input means of said encoding means.

7. The multiplexer system as set forth in claim 6 including circuit means coupled in parallel to both said priority switching circuit means and encoding means for allowing a selected block of information signals to be coupled to said encoding means output prior to generation of the address signal corresponding to the priority switching circuit input providing said block of information signals.

8. The multiplexing system as set forth in claim 7 wherein said circuit means includes logic circuit means having a first set of n input means coupled respectively to the said *n* inputs of said priority switching circuit means and having a second set of *n* input means coupled respectively to the said *n* outputs of said priority switching circuit means, said logic circuit means further having *n* output means coupled to the said output means of said encoding means so that said logic circuit means is responsive to couple said selected block of information signals, under control of said priority switching circuit means, to said encoder output means prior to the said generation of the said address signal corresponding thereto.

9. A multiplexer system for connecting information signals received from a plurality of stations to transmission channel means comprising:

priority switching circuit means having a plurality of inputs coupled respectively to said plurality of stations and a like plurality of associated outputs, said priority switching circuit means acting to connect an information signal received on any one of said inputs to its said associated output when no other input is receiving an information signal;

pseudorandom generator means coupled to said priority switching circuit means so that the latter acts to select in a pseudorandom manner one information signal for connection to its said associated output when information signals are simultaneously present on more than one of said plurality of inputs; and encoding means coupled to said priority switching circuit means to generate an address signal on said transmission channel means identifying the station of said plurality of stations that is connected through said priority switching circuit means to said encoder means.

10. The multiplexing system as set forth in claim 9 wherein said information signals are divided into words and wherein logic circuit means are coupled between said priority switching circuit means and said transmission channel means so as to connect one of said words to said transmission channel means according to the operation of said priority switching circuit means, said priority switching circuit means acting at the termination of said one of said words to cause said encoding means to generate an address signal corresponding to the address of the station sending said one of said words.

11. The multiplexer system as set forth in claim 10 wherein said priority switching circuit means comprises:

a first decision level stage including first and second logic gate means each having an output and inputs sufficient in number so that said first logic gate means may be coupled to a group of one-half of said plurality of inputs and said second logic gate means may be coupled to a group of the other half of said plurality of inputs;

a second decision level stage including four logic gate means each having an output and inputs sufficient in number so that two of said four logic gate means may be coupled respectively to divide said group of one-half of said plurality of inputs again into one-half and the other two of said four logic gate means may be coupled respectively to divide said group of the other half of said plurality of inputs again into one-half;

further decision level stages having logic gate means coupled to further divide said groups into halves until said groups are one with each of said first, second and further decision level stages coupled to said pseudorandom generator; and an output stage having a plurality of output logic gate means equal in number to said plurality of inputs to said priority switching circuit means with one input of each of said plurality of output logic gate means respectively coupled to individual ones of the said plurality of inputs, each of said output logic gate means having further inputs equal in number to the number of decision level stages with said further inputs respectively coupled to the said outputs of said logic gate means of said decision level stages so that the simultaneous presence of words on more than one of the said plurality of inputs to said priority switching circuit means results in all but one of said plurality of output logic gate means being blocked.

12. The multiplexer system as set forth in claim 11 wherein each of said logic gate means comprises NOR-gate means.

* * * * *